United States Patent [19]
Kauer

[11] 3,799,529
[45] Mar. 26, 1974

[54] SUSPENSION SYSTEM, IN PARTICULAR FOR VEHICLES CAPABLE OF CROSS-COUNTRY TRAVEL

[75] Inventor: Harald Kauer, Ettlingen, Germany

[73] Assignee: Dr. Ludwig Pietzsch, Karlsruhe, Germany

[22] Filed: Nov. 10, 1972

[21] Appl. No.: 305,515

[30] Foreign Application Priority Data
Nov. 11, 1971 Germany.......................... 2155975

[52] U.S. Cl............................... 267/64 R, 280/124
[51] Int. Cl................................................ B60g 11/26
[58] Field of Search................. 296/65 R; 280/124; 267/131, 64 R, 64 A, 64 B, DIG. 1

[56] References Cited
UNITED STATES PATENTS
2,977,110  3/1961  Kilgore .......................... 267/DIG. 1
3,314,672  4/1967  Persson............................. 267/131

Primary Examiner—Robert G. Sheridan
Assistant Examiner—Lawrence J. Oresky

[57] ABSTRACT

A suspension system, in particular for vehicles capable of cross-country travel, such as tractors or caterpillar vehicles, includes springs connected in series to support the mass to be sprung, in particular the body mass of the vehicle, a coupler mass disposed between said springs, and a locking device operable by a control means to release the coupler mass approximately at one of the oscillation reversal or dead points of the mass to be sprung, in particular the vehicle body mass and to lock it again approximately after half the oscillation of the coupler mass, the springs being designed as hydropneumatic or gas/liquid spring elements, the hydraulic components of which are in fluid connection, the coupler mass being constituted by the liquid column of the hydraulic connection and the locking device comprising a valve arrangement connected in the hydraulic connection to block or open the same.

3 Claims, 9 Drawing Figures

SUSPENSION SYSTEM, IN PARTICULAR FOR VEHICLES CAPABLE OF CROSS-COUNTRY TRAVEL

A vehicle provided with a suspension system, may be regarded as being a body mass supported on the ground through a spring system. If a vehicle capable of cross-country travel, such as a tractor or caterpillar vehicle moves over uneven terrain, the body mass is forced to oscillate, such oscillations depending on the travelling speed of the vehicle and on the height of and distances between the bumps or depressions in the roadway. In the range of the natural frequency of the body mass the amplitudes of the oscillations of the mass may become much greater than the height of any bumps or depressions.

The maximum travel of the spring of a vehicle suspension system sets limits for the height of the obstacles which can be taken as well as for the speed by which the vehicle may move over them.

Usually attempts at reducing the amplitude of the body mass are made by providing a dampening or shock absorbing means in parallel with the spring. In any such damper part of the oscillation energy of the undampened oscillation is converted into heat, which is dissipated. Increasing dampening on the one hand reduces the oscillation amplitudes of the body mass and, on the other hand, affords poorer suspension.

Any measure taken to reduce the amplitudes of the body mass by dampening necessarily leads to a compromise:

- the dampening must be so strong that enough energy is dissipated
- the dampening must be so weak that the effect of the springs is not reduced too sharply.

The oscillation energy dissipated by the dampening is at the expense of the propulsion energy of the vehicle and thus must be made up for by the drive means of the vehicle. The amount of energy to be dissipated is quite considerable when the body mass is large. Therefore, the dampers are subject to heavy wear. Finally, even at strong dampening it is not possible to drive the vehicle in the range of the resonant frequency or through said frequency range of the body mass because even the dampened oscillations are still too strong and no vehicle let alone the driver, can be expected to put up with them. Besides, the dampers are overloaded to such a degree that they will fail after a short time.

For these reasons it is avoided to drive vehicles suitable for cross-country travel and equipped with the known suspension system comprising dampers at a speed in or near the range of resonant oscillations over uneven ground. As the resonant frequency range usually lies at rather low speeds and even the passing through the resonant frequency range causes the disadvantages discussed above, travel over uneven terrain so far is possible only at extremely low speeds.

It is an object of the invention to provide for such design of the suspension system that oscillations of the mass to be sprung by the suspension system are diminished or extinguished effectively also in the resonant frequency range of the mass to be sprung.

It is a further important object of the invention to provide for such design of the suspension system that oscillations of the mass to be sprung are diminished or extinguished without dissipation of energy.

Another object of the invention is to provide a suspension system for vehicles suitable for cross-country travel permitting the vehicle equipped with such suspension system, e.g. a tractor or caterpillar vehicle to be driven over uneven terrain at higher speed and even in the resonant frequency range and beyond, the unevenness of the ground to be taken by the vehicle reaching up to the dimensions of the maximum path of the spring.

A suspension system according to the invention comprises springs connected in series to support the mass to be sprung, a coupler mass disposed between the springs, and a locking device operable by a control means to release the coupler mass approximately at one of the oscillation reversal or dead points of the mass to be sprung, in particular the vehicle body mass, and to lock it again approximately after half an oscillation of the coupler mass, the springs being designed as hydropneumatic spring elements, the hydraulic components of which are in fluid connection, the coupler mass being constituted by the liquid column of the hydraulic connection, and the locking device comprising a valve arrangement connected in the hydraulic connection to block or open the same. With such a suspension system oscillating movements of the mass to be sprung are largely avoided even if it is excited to oscillate in its resonant frequency range. The oscillating condition of the mass to be sprung may be determined by measuring the force and/or time, path, speed, acceleration.

A suspension system according to the invention used for suspension of a vehicle operates as follows:

When the vehicle is stopped the locking device is released. As soon as the vehicle starts moving the locking device locks the coupler mass with respect to the body mass at a slight deflection of the body mass already. The locking device then stores the spring energy of the locked spring, while the other spring remains fully effective.

When the vehicle moves over uneven terrain, the body mass and the coupler mass connected with the same remain at rest as long as the unevenness is slight and the speed high. However, if that is not the case, the body mass is forced to oscillate about the static equilibrium position of the system and the amplitude and direction of the oscillations are detected by the control means, for instance, in the form of the oscillating speed.

The control means realeases the locking device at a change of the direction of the speed (dead or reversal point of the oscillation of the body mass). Due to the spring energy released by the locking device the coupler mass then begins to oscillate at its natural frequency with an initial deflection with respect to its static equilibrium position. The locking device is closed after half the oscillation period of the coupler mass, i.e., at a time at which the coupler mass is located at the oposite dead or reversal point of its oscillation. Hereby another amount of energy in the form of spring energy is stored in the locking device. This energy, however, is of opposed effect (sign) as compared to the previously stored amount of energy. The locking device remains closed until the control means again reports reversal of the oscillating movement of the body mass. Then the switching cycle starts again.

Thus stored energy is supplied to the suspension system of the invention at suitable times (lock release)

and is again withdrawn from the same after a very short time (half the oscillation period of the small mass) and at opposed sign. This prevents oscillations of the body mass of great amplitude. The body mass merely oscillates at small amplitudes and at frequencies corresponding approximately to those of the coupler mass. Since the locking device is controlled by way of the oscillating condition, e.g., the oscillating speed of the body mass, extinction or at least diminuation of the oscillations may be obtained at any exciting frequencies without any dissipation of energy by dampening.

It is further object of the invention to provide a simplified suspension system suited in particular for the effective diminishing or extinction of oscillations of a vehicle seat caused to oscillate when the vehicle moves over rough ground.

Therefore, a suspension system according to the invention comprises springs connected in series to support the mass to be sprung, in particular the seat of the vehicle, a coupler mass disposed between said springs, and a locking device operable by a control means to release the coupler mass approximately at one of the oscillation reversal or dead points of the mass to be sprung, in particular the mass of the seat and to lock the same again approximately after half an oscillation of the coupler mass, the locking device comprising two ratchet means capable of being switched and acting in opposed sense to selectively cooperate with the coupler mass between two springs, in particular helical springs, connected in series, the first ratchet means being designed to block movement of the coupler mass in the one effective direction of the springs and the second ratched means to block movement in the opposite effective direction.

Fundamentally, this suspension system operates as the one described above. It is simplified in that the locking after half an oscillation of the coupler mass may be effected automatically by the utilization of the unidirectional ratchet means without the need for any locking signal to be supplied by the control means. Thus there is no need to measure the very brief half oscillation period of the coupler mass, transmit a control signal, and effect the locking process within the shortest possible time of response. That is technically complicated but needed with the suspension system first described.

A useful control means for all the suspension systems speciied comprises measuring means for detecting the pitching oscillations and the lifting oscillations to transmit the signals for actuation of the locking device, preferably at or near zero of the pitching and/or lifting speed curve through the zero line marking the time. Separate measuring means may be provided for the pitching oscillations and for the lifting oscillations. In a first embodiment they comprise a gyroscope for detecting the pitching oscillating speed mounted a the pitching pivot point of the vehicle body and of an acceleration sensor with an integrator connected to the output thereof to detect the lifting oscillating speed. The separate measuring of the pitching and lifting oscillating speeds requires provision of two separate control channels which are reversed automatically in dependence on the relationship between lifting and pitching speed. In that case only one type of oscillations each is attackable. This first embodiment of the control means thus does not permit the simultaneous diminuation or extinction of lifing and pitching oscillations. In practice, however, lifting and pitching oscillations, are superposed in time. Therefore, a preferred second embodiment of the control means for joint and simultaneous attack of both kinds of oscillations provides as measuring means for detecting the pitching oscillations and the lifting oscillations of the body mass two acceleration sensors, with integrators connected to the output thereof, one being disposed at the front end in the travelling direction and the other one at the rear end of the mass in particular the vehicle body.

Conveniently, the output signals proportional to the oscillating speeds furnished by the acceleration sensors formed of the acceleration sensors with the integrators, are combined according to the function $V_1 - k \cdot v_2$, wherein $k$ is a constant, and the switching signal for the locking device is always emitted as this function passes through zero.

A preferred value for the constant $k$ is 2.

The invention will be described further by way of example, with reference to the accompanying drawings, in which.

Figure 1:
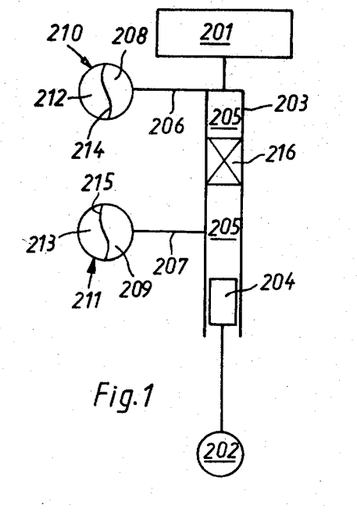
FIG. 1 illustrates a diagrammatic layout of a first embodiment of a suspension system according to the invention.

The suspension system according to FIG. 1 is arranged between the body 201 and the wheel 202 of a vehicle capable of driving over rough terrain. An hydraulic cylinder 203 of the suspension system is mounted on the body of the vehicle, and the piston 204 of the cylinder 203 is pivoted at the support of the wheel 202.

The pressure chamber 205 of the hydraulic cylinder communicates through conduits 206 and 207 with liquid spaces 208 and 209, respectively, of accumulators 210 and 211, respectively. The accumulators 210 and 211 further comprise gas spaces 212 and 213, respectively, which are separated from the liquid spaces 208 and 219 by means of flexible diaphragms 214 and 215, respectively. A valve arrangement 216 is provided in the pressure chamber 215. This valve arrangement comprises two non-return valves which can be opened, act in opposite directions, and are capable of being controlled individually. The valve arrangement 216 is actuated by a sensor measuring the oscillating speed of the body 210.

The suspension system shown in FIG. 1 operates as follows: When the vehicle is stopped, both non-return valves of the valve arrangement 216 are open so that the accumulator spaces 208 and 209 communicate with each other. As the vehicle starts to move, the valve arrangement 216 is closed even at minor deflection of the body mass 201, i.e., both non-return valves are closed. Thus only the accumulator 211 acts as an hydropneumatic spring element, whereas the spring energy of the accumulator 210 is stored by means of the valve arrangement.

When the vehicle moves over an uneven roadway, the body mass 201 is caused to oscillate or swing about the static equilibrium position of the system. The sensor senses the amplitude and direction of these oscillations as oscillating speed.

The sensor opens either one of the non-return valves of the valve combination 216 in dependence on the direction of the oscillating speed as soon as the oscillating speed reaches zero. Thereupon the released spring energy of the accumulator 210 causes the column of hydraulic oil to begin to oscillate at natural frequency in the cylinder 205 and conduits 206 and 207 with an initial deflection with respect to its static equilibrium position. After one half of the oscillation time of the liquid column, in other words, at a time at which the liquid column is at its opposed point of return of the oscillation, the liquid which now begins to flow back closes the previously opened non-return valve of the valve combination 216. Hereby again an amount of energy in the form of spring energy is stored in the accumulator 210. This time, however, the stored energy has the opposed effect (reversed sign) of the energy stored previously. The valve combination 216 remains closed until the sensor again signals a change of sign of the speed of the body mass. Then a new switching cycle begins by opening of that non-return valve of the valve combination 216 which is determined by the direction of the speed.

Figure 6:
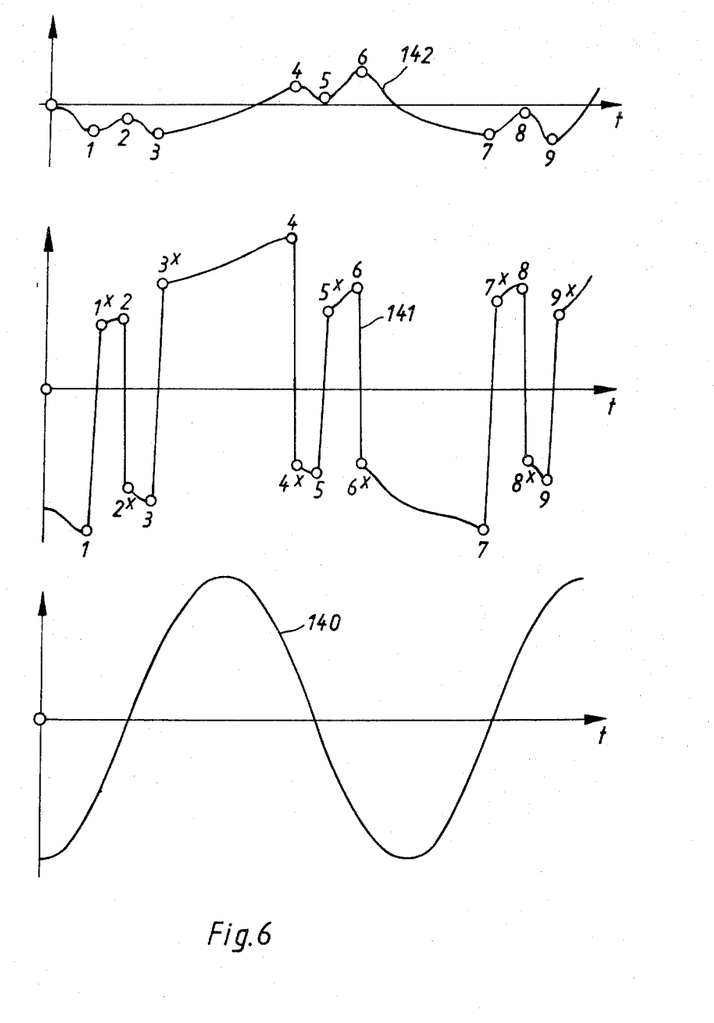
FIG. 6 illustrates three coordinated graphs in each of which a given roadway profile and the corresponding deflections of the body mass caused by the same as well as the coupler mass are plotted with reference to time, to demonstrate the mode of operation of the suspension system according to FIG. 1, 2 or 3.

The mode of operation of the suspension system is illustrated in FIG. 6.

The three graphs shown in FIG. 6 in which deflections are plotted with reference to time t are coordinated with each other in vertical direction. The lowest one illustrates a desired predetermined roadway profile 140 which is shown by way of example with periodic changes. The graph above illustrates the deflections 141 of the coupler mass formed by the liquid column in the cylinder 205 and the conduits 206, 207 as resulting from the changing profile and the upper graph illustrates the deflections 142 of the body mass 201.

The points marked $1^+$ to $9^+$ in the deflection curves 141 and 142 indicate the times at which the locking is released. At each of these times the deflection speed of the body mass becomes zero.

Points 1 to 9 characterize those points in the deflection curve 141 at which the locking device is locked again after half an oscillation each of the coupler mass. Between each two times $1^+$ and 2, $2^+$ and 3, $3^+$ and 4, and so on, the coupler mass consequently is rigidly connected with the body mass so that it swings in sychronism with the same and at the same deflection.

It is evident from FIG. 6 that the body mass is kept almost at rest in spite of great unevenness in the roadway.

In the suspension system shown in FIG. 1 shock absorbing means which dissipate considerable amounts of energy at greater body oscillations are eliminated. Despite that it is possible for a vehicle equipped with a suspension system as shown in FIG. 1 to move at any desired speed over uneven terrain the size of the bumps and depressions corresponding in extreme cases approximately to the permissible travel of the spring, without amplifying the oscillations of the body mass such that the amplitude would no longer be permissible. This also applies to oscillations within the range of the natural frequency of the body mass.

Figure 2:
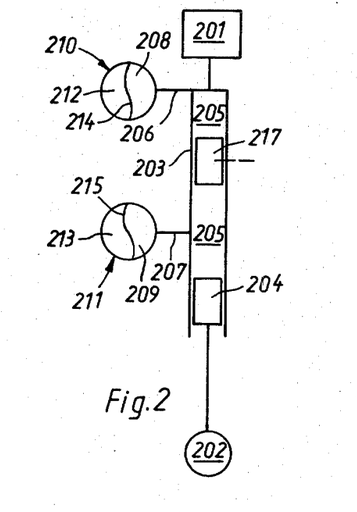
FIG. 2 illustrates a diagrammatic layout of a modified suspension system according to the invention.

In FIGS. 1 and 2 like parts are designated by the same reference numerals and, inasmuch as the embodiments are alike, the structure and operation of the embodiment shown in FIG. 2 is not described again. Other that with the embodiment according to FIG. 1, which comprises a valve arrangement, the pressure chamber as shown in FIG. 2 is provided with a freely floating piston 217. The freely floating piston is locked and released in the cylinder by a locking device (not shown) in the same rhythm as the valve arrangement in the embodiment of FIG. 1.

Figure 3:
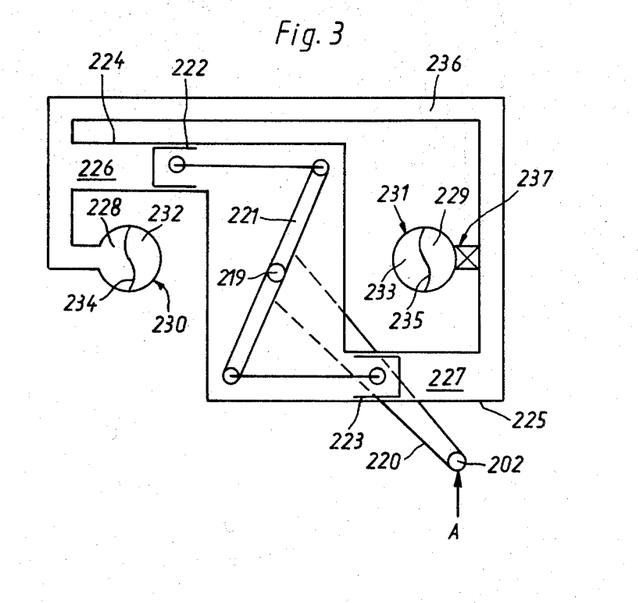
FIG. 3 illustrates a modified embodiment of the suspension system according to the invention.

FIG. 3 shows a particularly advantageous embodiment of the invention. With this embodiment the wheel 202 of the vehicle subjected to a force in the direction of the arrow A is supported at one end of a support arm 220, the other end of which is attached to the center of a link 221 which in turn is connected by an axle 219 to the body (not shown). A piston each 222 and 223 is pivoted at the free ends of the link 221. The pistons 222 and 223 operate in hydraulic cylinders 224 and 225, respectively. The pressure chambers 226 and 227 of the cylinders 224 and 225, respectively, communicate with liquid spaces 228 and 229 of accumulators 230 and 231, respectively. The accumulators 230 and 231 each comprise a gas space 232 and 233, separated by flexible diaphragms 234 and 235, respectively, from the liquid spaces 228 and 229, respectively. The pressure spaces 226 and 227 of the two cylinders 224 and 225 communicate through a conduit 236. This arrangements plus the fact that the pistons act in opposed sense provides a series arrangement of the two hydropneumatic spring elements.

The suspension system of FIG. 3 as described thus far corresponds to a conventional suspension system. It is merely supplemented by a valve combination 237 (FIG. 4) connected in the conduit 236 through which the two liquid spaces 228 and 229 communicate. The two accumulators which also the conventional suspension system comprises, are so much larger here that one spring will have the same spring rate as the two springs connected in series in the conventional suspension system. As the body (not shown) oscillates, the valve arrangement is acutated in the same rhythm as the suspension systems according to FIG. 1 or 2.

At normal driving conditions of the vehicle the valves of the valve arrangement 237 are open. The spring characteristic is identical to that of the conventional suspension system. However, apart from any possible throttling in the conduit 236 connecting the two accumulators 231 and 230, the suspension system is operated without any dampening.

When oscillations of the vehicle occur, the non-return valves of the valve arrangement 237 are closed at the time of maximum deflection in either direction so as to shut-off the accumulator 231, thereby storing spring energy in the accumulator 231. The body mass (not shown) is then moved back into the static equilibrium position by the accumulator 230 which is still active. At this position the angular pitching speed of the body mass has become zero. At this time one non-return valve is opened and the biased amount of liquid, e.g. oil in the accumulator 231 is accelerated. It flows very quickly into the accumulator 230 to bias the same. As the oil swings back from the accumulator 230 into the accumulator 231, the other non-return valve is closed so that the accumulator 230 remains loaded and the accumulator 231 remains closed in discharged condition. If an obstacle in the roadway then tends to move the body mass (not shown) upwardly, the active accumulator 230 mus be discharged again so as to counteract the movement of the body. To this end the other non-return valve is opened and the oil of the active, loaded accumulator 230 flows into the empty accumulator 231 to bias the same. At the time at which the oil wants to flow back into the accumulator 230, the one non-return valve of the valve arrangement 237 is closed. The cycle is repeated in reverse direction if the mass of the vehicle tends to move downwardly.

Thus stored energy is supplied to the suspension system according to the invention (opening of the valve) at suitable times and is withdrawn again from the same with reversed sign after a very short interval (half of the oscillation of the oil between the two accumulators).

Figure 4:
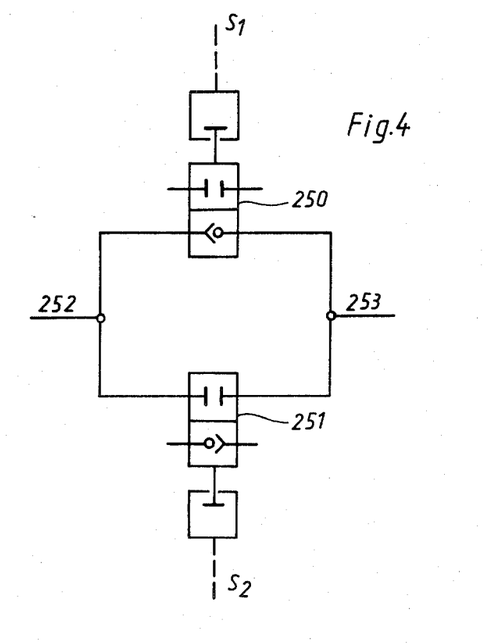
FIG. 4 illustrates a diagrammatic embodiment of a valve arrangement conveniently used in the suspension system of the invention.
Figure 5:
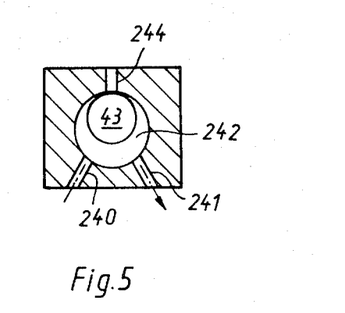
FIG. 5 illustrates a cross sectional elevation of a nonreturn valve preferably used with the invention.

FIG. 4 shows a diagram of a valve arrangement preferably used with the embodiments according to FIGS. 1 and 3. The valve combination comprises two non-return valves 250 and 251 capable of being opened and each permitting flow in one direction only. Valve 250 permits flow from the inlet 252 to the outlet 253 when control line S1 is actuated. Return flow from the outlet 253 to the inlet 252 is not possible until the control line S2 of the valve 251 is actuated. The sensor which detects the oscillating speed of the body mass controls either valve 250 or valve 251 in dependence on the direction of the speed. FIG. 5 is a diagrammatic representation of a non-return valve capable of being opened. This valve is preferably used as valve 250 and 251 in the valve arrangement according to FIG. 4. The valve has an inlet passage 240 and an outlet passage 241. The two passages 240 and 241 of relatively large cross sectional area communicate through a valve chamber 242 when the valve is open. The valve chamber 242 houses the valve member 243, the mass of which is relatively small. The hydrualic pressure acting in the pressure chamber 205 or 226 and 227 urges the valve member 243 generally away from the openings of the passages 240 and 241 in the valve chamber 242. A passage 244 is located at the side of the valve chamber 242 opposite the openings of the passages 240 and 241, and the valve member 243 may be subjected to high pressure through this passage. Under the action of this high pressure the valve member 243 briefly enters into sealing engagement with the opening of the passage 241 in the valve chamber 242. This interrupts the flow between the passages 240 and 241 so that only one accumulator each will be operating. As the oil flows back from the passage 241 to the passage 240, the valve member 243 is forced, by reason of its geometry, to enter quickly into sealing engagement with the opening of the passage 240 so that the valve is blocked upon reversal of the direction of flow. The valve shown in FIG. 5 may also replace the valve arrangement of FIG. 4, provided it operates at sufficient actuating speed, and it may be installed directly as "valve arrangement" 216 or 237 in the suspension system according to FIG. 1 or 3, respectively.

The sensor may be embodied by a gyroscope fastened at the vehicle. It senses the pitching oscillations of the vehicle and actuates the quick-acting valve in the rhythm defined above.

Figure 7:
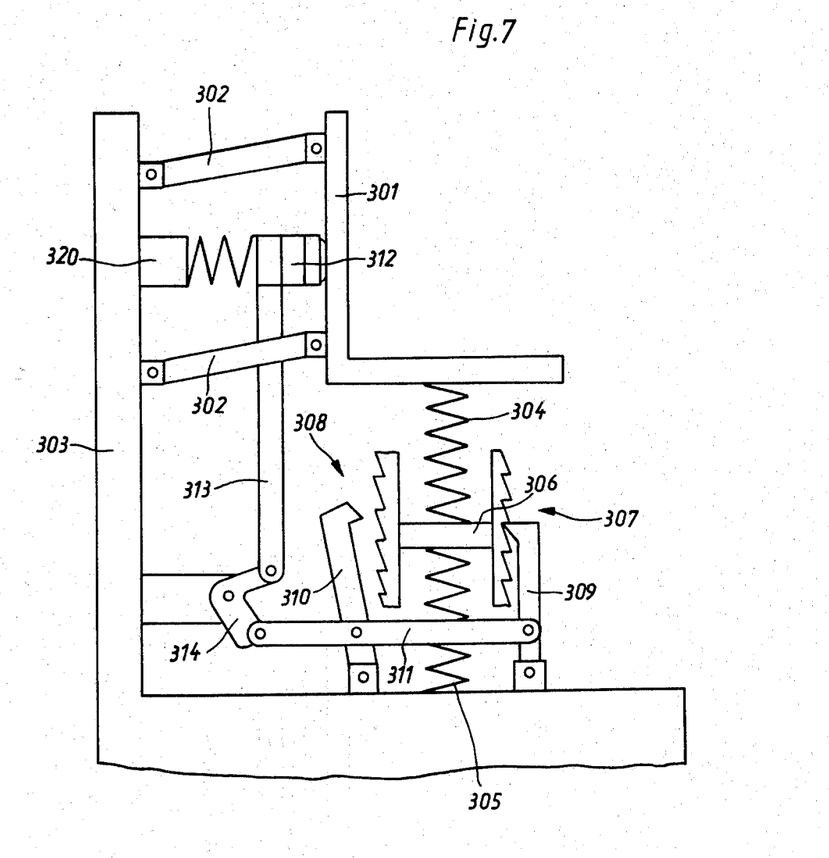
FIG. 7 illustrates a diagrammtical layout of a third embodiment of a suspension system according to the invention.

The embodiment of FIG. 7 shows the seat 301 of a vehicle pivoted at the vehicle body by means of a parallel linkage 302 designed for easy pivoting motion. The seat 301 is cushioned by two springs 304 and 305 connected in series. Two ratchet and pawl means 307 and 308 are mounted on a link 306 between the two springs 304 and 305. The pawls 309, 310 of these ratchet means 307, 308 are supported at the vehicle body and interconnected by a connecting bar 311. A friction pad 312 is arranged so as to be pressed against a friction surface at the driver's seat. Movement of the friction pad is transmitted to the connecting bar 311 by a shifting rod 313 and a toggle link 314. Movement of the friction pad 312 into pressure contact is caused by a coupling device 320 by means of a servo force. The coupling device 320 receives its switching signals from an acceleration sensor (not shown) mounted at the seat 301 and provided at its output side with an integrator. The accelertion sensor measures the absolute speed of the seat 301, i.e., its speed relative to the stationary underground and emits a switching signal when the absolute speed of the seat motion approaches or reaches zero.

FIG. 7 shows the driver's seat 301 in equilbrium position at which any relative movement of the seat 301 with respect to the vehicle body 303 is cushioned only by the spring 304 because the spring 305 is locked against compression by the pawl 309 of the unidirectional ratchet means 307. Upon oscillating movement of the seat 301 the friction pad 312 is pressed against the seat in response to the switching signals emitted by the acceleration sensor, thus following further movement of the seat together with the linkage assembly 311, 313, 314. Since this disengages the pawl 309, the spring 305 is released so that the link 306 may swing towards the vehicle body 303, at the same time compressing the spring 305. Simultaneously, i.e., as the pawl 309 of the hatchet means 307 is disengaged, the pawl 310 of the ratchet means 308 is engaged. This does not obstruct the oscillating movement of the two springs 304, 305 towards the vehicle body 303. Yet the pawl prevents the link 306 from reversing its direction of movement so that after half an oscillation the link is again locked and energy is stored in the spring 305. In this respect the present embodiment does not differ from those described previously. The difference resides in the fact that the locking process is effected without the aid of control means. In other words, there is no need for measuring the very brief period of one half of the oscillation of the link and then emitting a switching signal, as required with the other embodiments, a requirement which can be realized at considerable expense only. The ratchet means 307, 308 may be replaced by any commercially available one-way clutch devices, such as overrunning clutches with roller members or cam members which are of simple structure and have proved very successful in practice.

Figure 8:
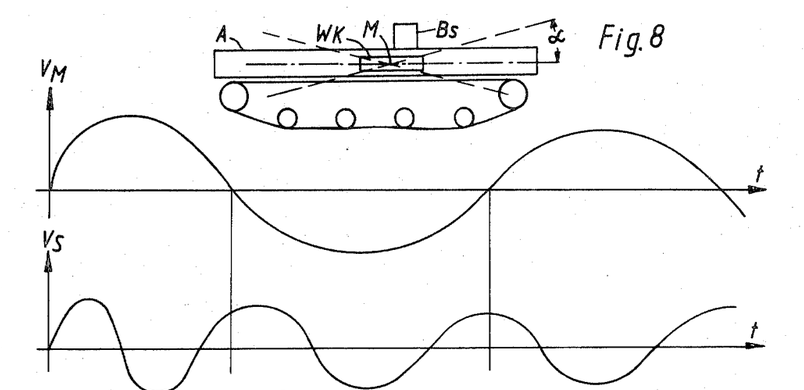
FIG. 8 illustrates two graphs of the course of the pitching speed and lifting speed, respectively, with reference to time approximately at the pitching pivot point of the vehicle, including a vehicle diagram with a first measuring arrangement according to the invention.

At the top of FIG. 8 a tractor is shown diagrammatically which may pitch at the angle $\alpha$ about the pitching pivot point M. The body mass A is caused to make such angular pitching movements in the form of oscillations when the vehicle travels over rough ground. The vehicle is further caused to carry out oscillating lifting movements. The course $v_M$ of the speed of the pitching movements and the course $v_S$ of the speed of the lifting movements are plotted in the two graphs of FIG. 8.

A gyroscope WK is disposed approximately at the pitching pivot point M to sense the pitching speed $v_M$. The lifting oscillation speed $v_S$ is sensed by an acceleration sensor $B_S$ which is connected with its output to an integrator (not shown) to determine the lifting oscillation speed $v_S$.

A switch-over device, likewise not shown, renders either the gyroscope WK or the acceleration sensor $B_S$ active so that either of them will emit switching signals for actuating the locking device. These switching signals are always emitted as the respective speeds become approximately zero.

The switch-over device is of such design that it will keep the gyroscope WK actuated up to a predetermined minimum pitching oscillating speed, that it will switch off the gyroscope WK below said minimum pitching speed and switch on the acceleration sensor $B_S$, and that it will again switch off the acceleration sensor $B_S$ and switch on the gyroscope WK upon failure to reach a minimum lifting speed.

Figure 9:
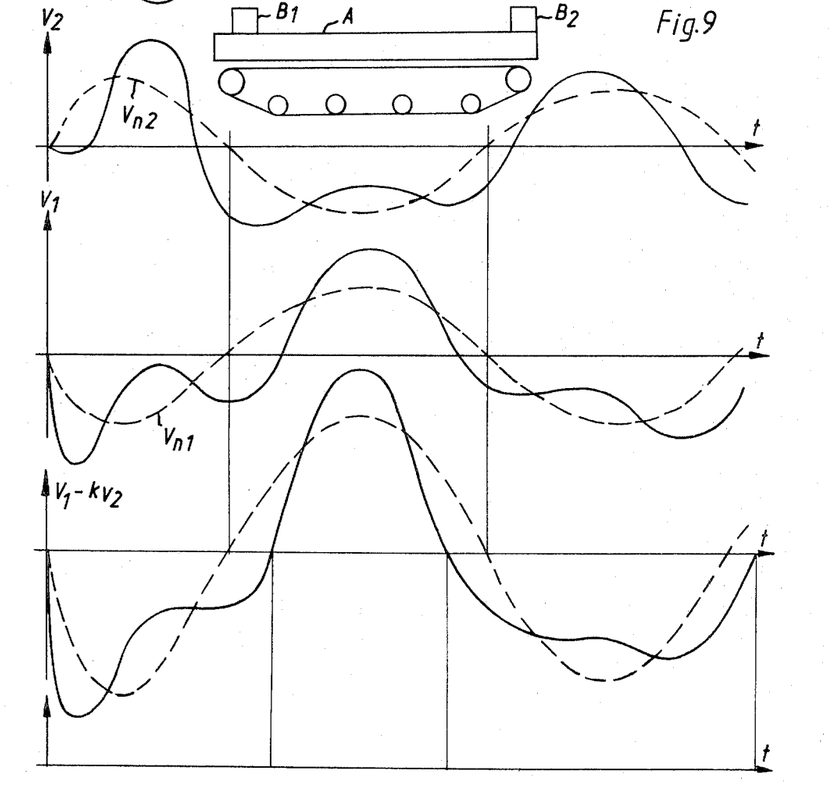
FIG. 9 illustrates three graphs of courses of oscillating speeds with reference to time, the two top graphs illustrating the combined pitching-lifting-oscillating-speed at the front and rear ends of the vehicle and the lower graph illustrating a course combined according to a given function of the two upper speeds, including a vehicle diagram with a second preferred measuring arrangement according to the invention.

The graphs of FIG. 9 relate to the acceleration sensor arrangement as shown in the diagram of the tractor at the top of FIG. 9. The body mass A is provided at the front end in the direction of travel with an acceleration sensor $B_1$ and at the rear end with another acceleration sensor $B_2$. An integrator each (not shown) is connected to the output of the acceleration sensor. Therefore, as a whole the oscillating speeds $v_1$ and $v_2$ are detected. These oscillating speeds are composed of the lifting speeds and pitching speeds. The speeds $v_1$ and $v_2$ are plotted in the upper two graphs of FIG. 9. For comparison the two graphs further show in dashed lines the respective pitching oscillating speeds $v_{n2}$ and $v_{n2}$ which could only be detected by separate gyroscopes not shown.

The dashed-line pitching speeds and the continuous-line speeds composed of lifting and pitching speeds $v_1$ and $v_2$ are combined in the lowest graph of FIG. 9 according to the relationship: $v_1 - k \cdot v_2$. It can be seen in this graph that the passing points of the curve $v_1 - k \cdot v_2$ through the zero line are shifted as compared to the respective points for the dashed-line curve of the pure pitching speed which always remain at the same place and thus also correspond to the respective points in the top graphs of FIG. 8. This shift is needed in order to be able to cover both the pitching speed and the lifting speed.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A suspension system comprising springs connected in series to support the mass to be sprung, in particular the seat of a vehicle, a coupler mass disposed between said springs, and a locking device operable by a control means to release the coupler mass approximately at one of the oscillation reversal or dead points of the mass to be sprung, in particular the mass of the seat and to lock the same again approximately after half an oscillation of the coupler mass, the locking device comprising two switchable ratchet means acting in an opposed sense to selectively cooperate with the coupler mass between two springs, in particular helical springs, connected in series, the first ratchet means being designed to block movement of the coupler mass in the one effective direction of the springs and the second ratchet means to block movement in the opposite effective direction.

2. A suspension system as claimed in claim 1, characterized in that the ratchet means are formed as clamping devices.

3. A suspension system as claimed in claim 1, further comprising actuating means connected to each ratchet means and effective to press said ratchet means into frictional locking engagement with the mass at the desired switching time.

* * * * *